United States Patent [19]
Baxter

[11] Patent Number: 5,177,679
[45] Date of Patent: Jan. 5, 1993

[54] PICOPROCESSOR

[75] Inventor: Michael A. Baxter, Sunnyvale, Calif.

[73] Assignee: Advanced Micro Devices Inc., Sunnyvale, Calif.

[21] Appl. No.: 292,208

[22] Filed: Dec. 29, 1988

[51] Int. Cl.⁵ .............................................. G06F 1/00
[52] U.S. Cl. .................................................. 395/800
[58] Field of Search ... 364/200 MS File, 900 MS File, 364/749

[56] References Cited

U.S. PATENT DOCUMENTS

| | | | |
|---|---|---|---|
| 4,296,475 | 10/1981 | Nerderlof et al. | 364/200 |
| 4,514,804 | 4/1985 | Kimoto | 364/200 |
| 4,517,657 | 5/1985 | Schwefel | 364/900 |
| 4,604,658 | 8/1986 | Hibeno et al. | 364/900 |
| 4,612,613 | 9/1986 | Gershenson et al. | 364/200 |
| 4,789,957 | 12/1988 | Niehaus et al. | 364/749 |

Primary Examiner—Douglas W. Olms
Assistant Examiner—T. Samuel
Attorney, Agent, or Firm—Skjerven, Morrill, MacPherson, Franklin & Friel

[57] ABSTRACT

This invention provides an instruction-driven, bit stream sequencer for digital computers that uses a reduced instruction set with as few as four instructions. The sequencer receives a sequence of M-bit control words; and each control word consists of an $m_1$-bit flag select word that selects an input or output line (out of a population of up to $2^{m_1}$ lines) and an $m_2$-bit op code word that selects from among a population of $2^{m_2}$ instructions, with $m_1 + m_2 = M$. The sequencer uses two one-bit registers and a logic function unit. One register receives a bit from the input port of the sequencer and passes the bit to the logic function unit. The second register, which holds a bit representing the present state of the processing, also passes this bit to the logic function unit for formation of a logical function or command based on these two bits; the second register also serves as the source of bits for the output lines of the sequencer. Formation of the logical complement of a bit can be done internally or at the input and output ports.

3 Claims, 7 Drawing Sheets

| OPCODE | MNEMONIC | FUNCTION | SYNTAX OF OPERATIONS PERFORMED |
|---|---|---|---|
| 0 | aort(f) | read flag bit;<br>do (a <- a OR t); | {t= getbit(f); a=t l a; eoi();} |
| 1 | aortC(f) | read flag bit;<br>t<-/t;<br>do (a <- a OR /t); | {t= getbit(f); t=~t ; a=t l a; eoi();} |
| 2 | aandt(f) | read flag bit;<br>do (a <- a AND t); | {t= getbit(f); a= t & a; eoi();} |
| 3 | aandtC(f) | read flag bit;<br>t<-/t<br>do (a <- a and t); | {t= getbit(f); t=~t; a=t&a; eoi();} |
| 4 | out(f) | write flag w/ a; | {putbit(f) =a; eoi();} |
| 5 | outC(f) | write flag w/ ~a; | {putbit(f) =~a; eoi();} |
| 6 | ift(f, addr) | read flag bit;<br>if t == 1, jmp;<br>else skip; | {t=getbit(f); a=t; ++pc;<br>pc= (t==1) ? mem[pc] : ++pc; }<br>Note: This instruction uses 2 words |
| 7 | iftC(f, addr) | read flag bit; t<- /t<br>if t == 1, jmp;<br>else skip; | {t=getbit(f); t=~t; a=t; ++pc;<br>pc= (t==1) ? mem[pc] : ++pc; }<br>Note: This instruction uses 2 words |

| OPCODE | MNEMONIC | FUNCTION AND EQUIVALENT SYNTAX OF OPERATIONS |
|---|---|---|
| 0 | aort(f) | {t= getbit(f); a=t \| a; eoi(1);}<br>t gets input PLD in state 'f', then a is assigned (a OR t) |
| 1 | aandt(f) | {t= getbit(f); a=t & a ; a=t \| a; eoi(1);}<br>t gets input PLD in state 'f', then a is assigned (a AND t) |
| 2 | pusha(f) | {t= getbit(f); stack [--i] =a; a=t ; eoi(1);}<br>t gets input PLD in state 'f', a is stacked, than a gets t |
| 3 | popa(f) | {stack[i++] =a; t=a; putbit(f) =t; eoi(1);}<br>a is unstacked, t gets a, then Output PLD in state 'f' gets t |
| 4 | out(f) | {t=a; putbit(f) =t; eoi(1);}<br>t gets a, then Output PLD in state 'f' gets t |
| 5 | thrubit(f) | {t = getbit(f); a = t; putbit(f) = t; eol (1);}<br>t gets input PLD in state 'f', a gets t, then Output PLD which is also in state 'f' gets t |
| 6 | if(f, addr) | {t=getbit(f); a=t; ++pc; pc= (t==1) ? mem[pc] : ++pc; eoi(1)}<br>if (t==TRUE), jump to new location, otherwise skip<br>Note: This instruction uses 2 words |
| 7 | when(f, addr) | {t=getbit(f); a=t ; ++pc; pc= (t==1) ? mem[pc]; eoi (t==1); }<br>jump to new location when (t==TRUE)<br>Note: This instruction uses 2 words |

PICOPROCESSOR

FIELD OF THE INVENTION

This invention relates to an instruction-driven, bit stream sequencer for digital computers and provision of a reduced instruction set for the sequencer.

BACKGROUND OF THE INVENTION

Special purpose microprocessors are often required to execute sequences of instructions very quickly. One means of accomplishing this is to provide the microprocessor with a reduced set of instructions that can individually be implemented with little or no time delay for ancillary operations such as set-up or memory allocation.

Auslander et al., in U.S. Pat. No. 4,589,087, disclose use of a reduced set of computer instructions that facilitates performance of single machine cycle instructions. This technique is used to track carry operations in addition of digital variables and to provide overflow signals for such operations.

Case et al., in U.S. Pat. No. 4,777,588, disclose a high speed register file, for use with a reduced set of computer instructions, that allows efficient register allocation. One or more registers is local (contents inaccessible to procedures not involving that register directly), and one or more registers is non-local and allows access to its contents by other registers. This allows the integrity of a register file to be maintained.

SUMMARY OF THE INVENTION

The bit stream sequencer disclosed by this invention, sometimes called a picoprocessor here, is a machine that works with only a few components and works with a reduced instruction set having as few as eight independent operations code ("opcode") instructions that process the data, subject to control of the sequence of instructions by sequences of flag commands that are also delivered to the sequencer. The picoprocessor is a programmable logic device that requires very few gates or flip flops or data path wires to perform its functions. A stream of eight-bit (or, more generally, M-bit) control or instruction words is delivered to the central command unit of the picoprocessor. In one embodiment, each eight-bit instruction or control word is decomposed into three consecutive bits that determine which of eight opcode instructions is to be implemented for that instruction interval ($2^3 = 8$); and the remaining five bits of the instruction word determine which of 32 input lines and/or 32 output lines ($2^5 = 32$) is to be used to provide data (a single bit) for that time interval for implementation of the commanded instruction or provide an output path from the processor. The invention is not limited to operation on an eight-bit instruction word; a control word whose length is M bits, with an $m_1$-bit opcode instruction word and an $m_2$-bit input/output select word may also be used here (with $m_1 + m_2 = M$). This would allow use of up to $2^{m_1}$ different opcode instructions and up to $2^{m_2}$ input lines and up to $2^{m_2}$ output lines. If the number of bits in the control word is increased or decreased, the number of opcode instructions and/or the number of input/output lines available is increased or decreased accordingly.

The instruction set itself is orthogonal and clean and is well matched for use with the picoprocessor. The picocode used here for the instructions is compiler-friendly and is designed for use with a system using a C language or a language analogous to C. The picoprocessor, in its simplest embodiment, provides only two direct data path registers: A T register, holding a "t" bit or variable, that provides an input/output bit, a scratch pad bit or a testing bit; and an A register, holding an "a" bit or variable, that provides for bit storage and for dyadic logic operations. In one embodiment, the picoprocessor opcode instruction set comprises commands to form the following variables or perform the indicated operations on these variables: Formation of (a or t); formation of (a and t); output a; read t and perform a conditional branch operation, depending on t's logical value (0 or 1); and replace t in each of these preceding operations by t* (the logical complement of the t bit). Each bit in a input stream has one of two values, 0 or 1.

DESCRIPTION OF A PREFERRED EMBODIMENT

Figure 1:
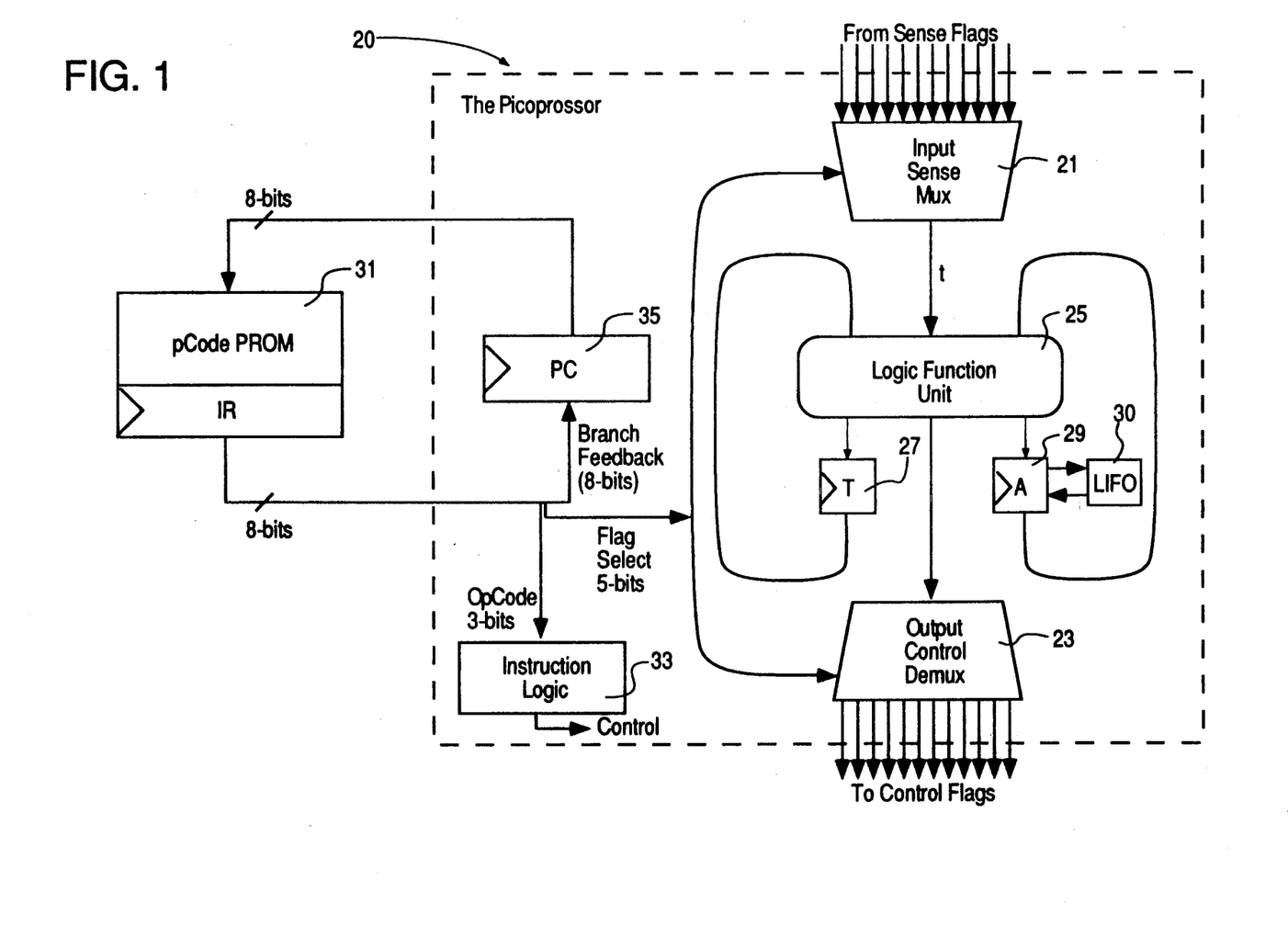
FIG. 1 is a schematic view of the picoprocessor engine core, illustrating the data and control sequence pathways in a simple embodiment.

With reference to FIG. 1, the picoprocessor 20 in one embodiment includes an input port 21 that contains sense logic and delivers data in as many as 32 parallel bit input streams and an output port 23 containing control logic provides 32 parallel bit output streams for delivery of the output data or function. Within each bit time interval (delineated by a clock pulse provided by a clock signal source 41 shown in FIG. 3), although 32 bits arrive more or less in parallel at the input port 21, only one bit from among these 32 bits is accepted in that time interval for further processing by the logic function unit 25 of the picoprocessor 20. Similarly, within each bit time interval, although the output port 23 provides up to 32 data paths for output of the data or function from the picoprocessor 20, only one of these 32-bit pathways will provide an output bit during that bit time interval.

In one embodiment the picoprocessor 20 further provides two one-bit registers, a T register 27 and an A register 29, each of which contains a single bit at any particular time. The T register bit, t, serves as an input/output bit, as a scratch pad bit, and as a testing bit for certain dyadic logical operations. The A register bit, a, is used for bit storage and for performance of certain dyadic logical operations; the a bit reflects the state of the "process" at any time.

The opcode instruction set itself, which has eight instructions therein in a preferred embodiment, is contained in a picocode installed in a programmable read only memory (PROM) or instruction register ("ir") 31. The instruction register 31 provides an eight-bit instruction word that is decomposed into three bits of operations code or opcode and 5 bits of flag select code. The three-bit opcode is directed to an instruction logic module 33 that controls the operations performed by the logic function unit 25. The five-bit flag select code is directed to the input port (multiplexer) 21 to determine which of the 32 incoming lines ($2^5 = 32$) will be interrogated; the bit on that chosen input line is taken into the T register 27 and into the logic function unit 25 for further operations; or the flag select code is directed to the output port (demultiplexer) 23 to determine which of the 32 outgoing lines will be used for the output of the contents of A register. A counter 35 with associated memory is provided to act as an instruction counter and to provide memory for conditional branch operations that are performed by the logic function unit 25.

Figure 7A:
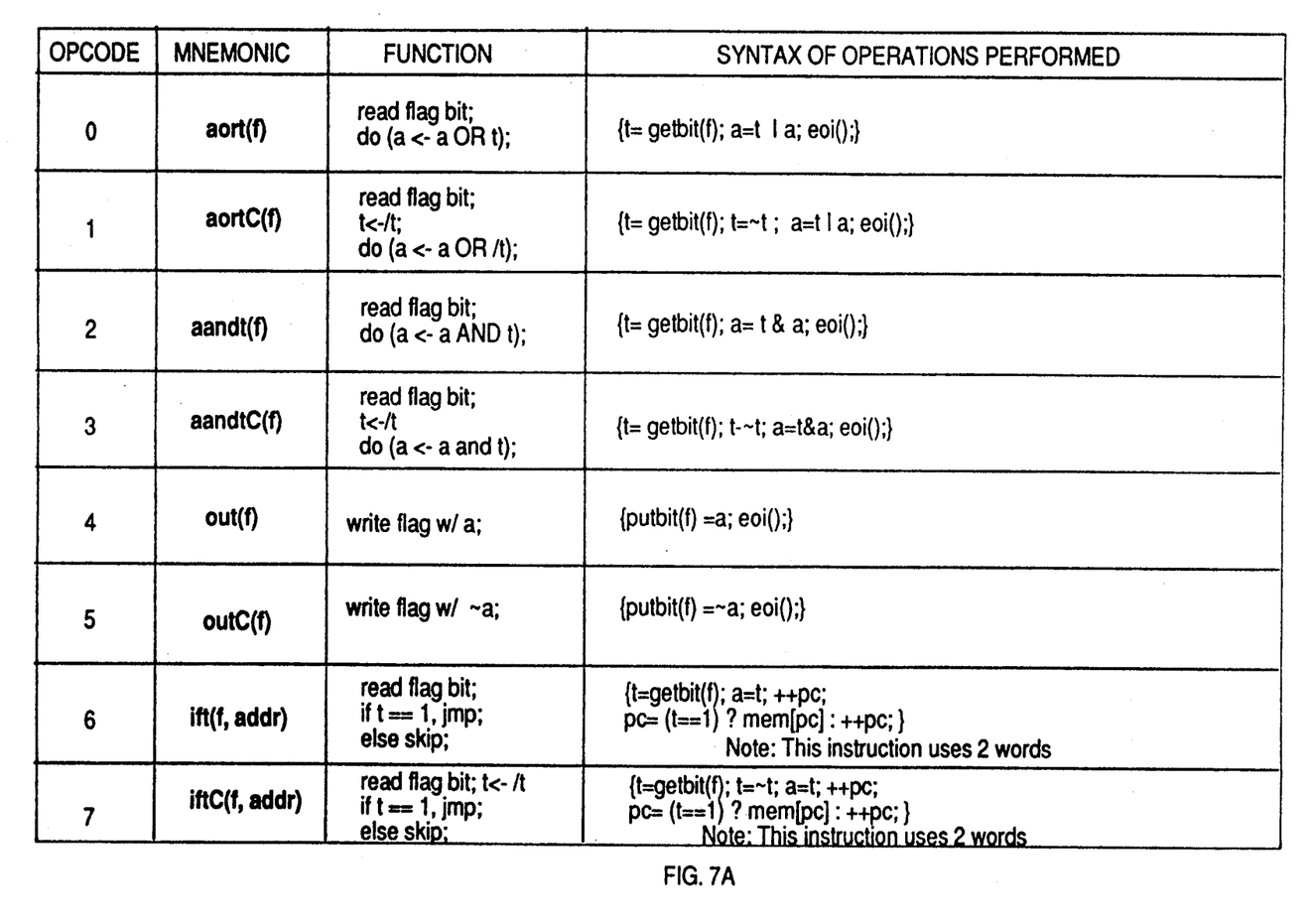
FIGS. 7A and 7B represents instruction set.

Table 1 presents the eight instructions of the picoprocessor instruction set in a preferred embodiment of the invention. The opcodes 0, 2, 4 and 6 correspond to use of the t bit as it is received from the input port. The opcodes 1, 3, 5 and 7 require that the t bit be logically complemented (t→t*) before this bit is used for further operations. Except for the substitution of t* for the t bit, the opcode pairs 0 and 1, 2 and 3, 4 and 5, and 6 and 7 are identical within each pair. Opcode 0 commands the logic function unit 25 in FIG. 1 to read the five flag select bits to identify one of the 32 bits appearing at the input port 21 as prescribed by the flag select code, read the bit on that line and place that bit in the T register 27, where this bit becomes a t bit, and to set the A register bit $a_{new} = a_{old} + t$; that is, set $a_{new} = 1$ if $a_{old} = 1$ or if $t = 1$, and set $a_{new} = 0$ if both $a_{old} = 0$ and $t = 0$. The command $t = getbit(f)$ is the command to read the flag bits f for the input line at the input port 21 selected by the flag select code and place the bit on that (selected) line into the T register. Opcode 2 commands the logic function unit 25 in FIG. 2 to read the chosen flag bits f, place the designated input bit in the T register, and form the following new bit for storage in the A register: $a_{new} = a_{old} \cdot t$; that is, $a_{new} = 1$ if both $a_{old} = 1$ and $t = 1$, and $a_{new} = 0$ otherwise.

Opcode 4 commands the logic function unit 25 in FIG. 1 to write the content of the A register (through the T register) onto one of the 32 output lines prescribed by the current flag select code at the output port 23. This output command is written symbolically $putbit(f) = a$.

Use of opcode 6 performs a dyadic logical operation or a conditional branch in the sequence of opcode instructions. If the logic function unit 25 receives opcode instruction 6, the bit identified by the flag select code is first read and placed in the T register; if this bit t has the logical value 1, the logic unit 25 jumps to the address specified as addr (in the two-word opcode instruction for opcode 6) in the memory of counter 35, performs the instruction or instructions required by the contents of memory address addr, and moves off again in another instruction sequence beginning with memory address addr. If the t bit is not logically equal to 1, the logic function unit 25 ignores the contents of the T and A registers and moves to the next consecutive instruction in the current sequence of instructions. The opcodes 6 and 7 each require two words, rather than one, so that the counter 35 is incremented by two instructions for the opcodes 6 and 7 and by one instruction for each of the opcodes 0-5. The symbol eoi() or eoi(b) in Table 1 indicates end of that instruction if the bit b appearing in the parenthesis is equal to 1.

The A register 29 may be optionally provided with an eight-bit LIFO shift register 30, as shown in FIG. 1, for use with a different set of eight instructions that is discussed below, or for storage of a bit for various purposes.

Figure 2:
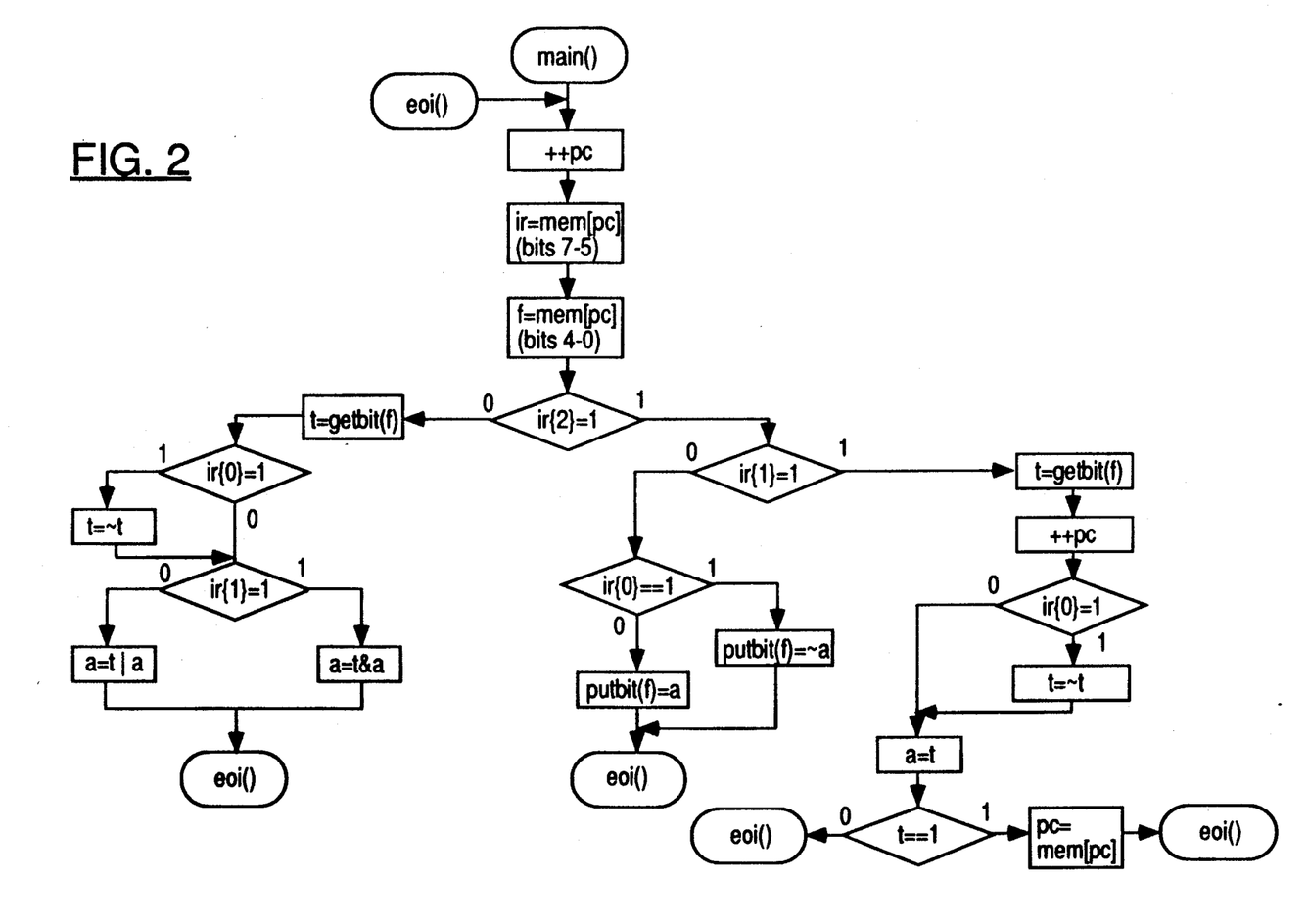
FIG. 2 schematically illustrates the picoprocessor instruction switch tree for the instruction set presented in Table 1.

FIG. 2 illustrates a picoprocessor instruction switch tree for the set of instructions illustrated in Table 1. Beginning at the top of the tree, the counter is incremented by one instruction (or by two instructions if the previous instruction was one of the opcodes 6 or 7), and the next instruction from the instruction register 31 is read and decomposed into the first three bits ir(m) (m=0, 1, 2) and into the remaining five bits ir(n) (n=3, 4, 5, 6, 7) of the eight-bit instruction word. The first three bits of the instruction word serve as opcode select bits, and the remaining five bits serve as flag select bits, as discussed above. FIG. 2 illustrates the use of the opcode select bits to determine the opcode instruction to be implemented.

The third bit ir(2) is first interrogated. If ir(2)=0, one of the opcodes 0, 1, 2, or 3 in Table 1 is selected, and the left branch of the configuration shown in FIG. 2 is followed. The logic function unit 25 accepts a bit from the input port 21 on the sense or input line designated by the five flag select bits (t = getbit(f)). If the first bit of the instruction word is ir(0)=0, the t bit is unchanged and the second instruction register bit ir(1) is interrogated. If the second bit of the instruction word is ir(1)=0, the a bit is replaced by the bit corresponding to the logical operation "a or t" ($a_{new} = a_{old} + t$), which is opcode 0. If ir(1)=1, the a bit is replaced by the bit corresponding to "a and t" ($a_{new} = a_{old} \cdot t$), which is opcode 2.

If the first bit ir(0)=1, the t bit is first logically complemented so that t becomes t*. If ir(1)=0, a is replaced by "a or t*," which is opcode 1. If ir(1)=1, a is replaced by "a and t*," which is opcode 3. This exhausts the possibilities where the third opcode instruction bit is ir(2)=0.

If the third bit of the instruction word ir(2)=1, the right half of the configuration shown in FIG. 2 is followed; this corresponds to the four opcode instructions 4, 5, 6 and 7 in FIG. 7A. If ir(1)=0, this corresponds to opcodes 4 and 5, which require that the a bit in the A register pass through the T register and appear on one of the output lines (determined by the five flag select bits) at the output port 23 (putbit(f)=a or =a* in FIG. 7A). If the first bit is ir(0)=0, opcode 4 is called for and the output signal is putbit(f)=a. If the first bit is ir(0)=1, opcode 5 is called for; the a bit is complemented before that bit is passed to the selected output line, and the output signal becomes putbit(f)=a*.

If the second bit of the instruction word is ir(1)=1, one of the opcodes 6 and 7 is called for and a conditional branch (dyadic logical operation) is called for with t=getbit(f). If the first bit is ir(0)=0, the t bit value is placed in the A register (a=t) and the t bit is interrogated; if the logical value of the t bit is 1, the next instruction to be read is prescribed by the memory address addr of the counter 35 as shown in Table 1, and the system executes a branch or jump to that instruction; if the t bit has a logical value of 0, no branch or jump is executed and the next instruction read is the next consecutive instruction given by the counter 35. If the first bit is ir(0)=1, the t bit is first replaced by its logical complement t* and the new t bit (t*) is replicated in the A register (a=t*); if the logical value of the t bit is 1, a branch or jump is executed and the next instruction read is the instruction found at memory address addr in the counter 35; if the logical value of the t bit is 0, the next instruction read is the next consecutive instruction given by the counter 35.

This completes the instruction switch tree for the eight opcode instructions in the preferred embodiment shown in Table 1. The algorithm used here is opcode (number)=4.ir(2)+2.ir(1)+1.ir(0). A different instruction switch tree than the one shown in FIG. 2 would be used for a different opcode instruction set, such as shown below in Table 2.

Figure 3:
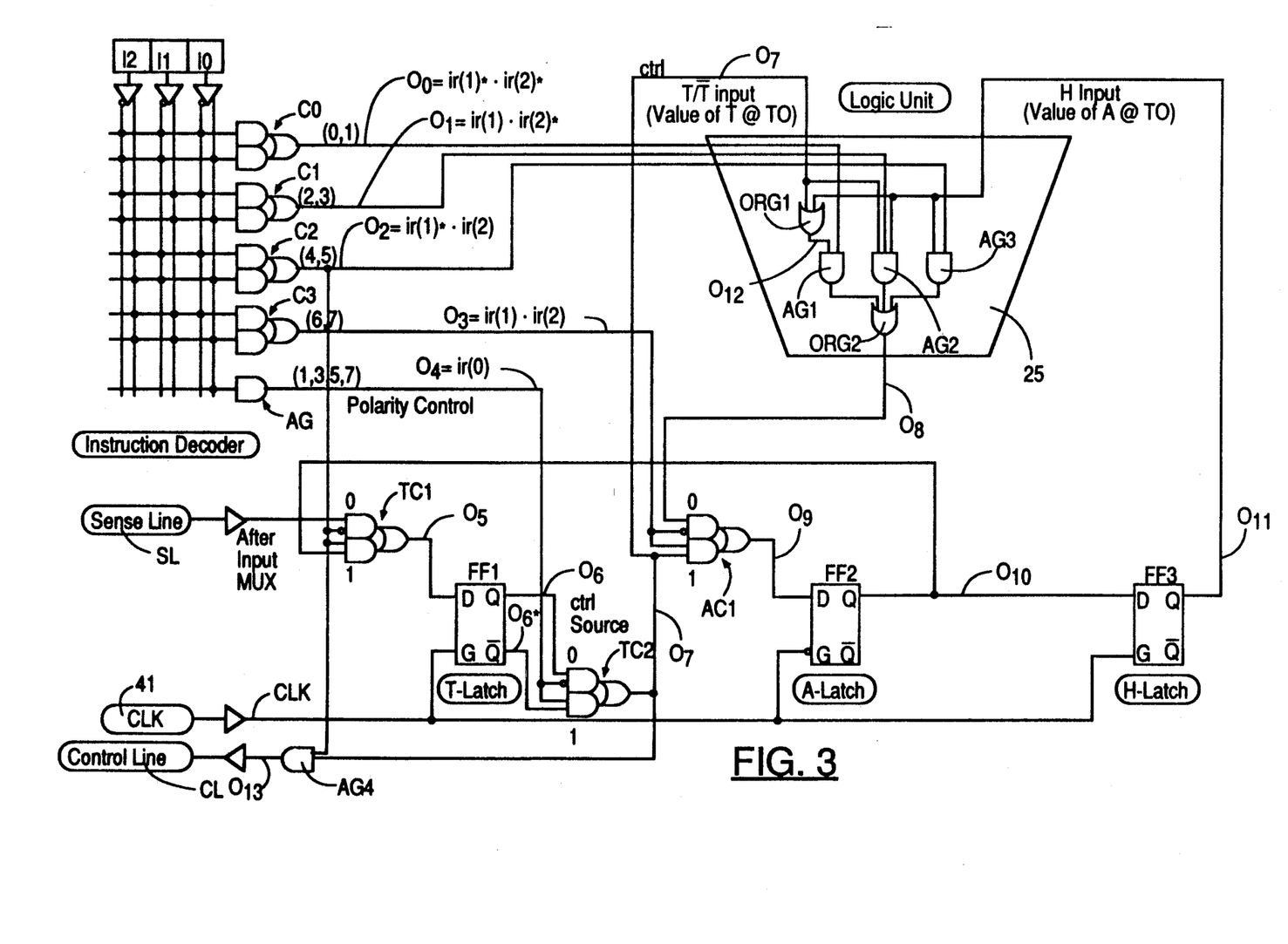
FIG. 3 represents a logic diagram of the picoprocessor engine core in a simple embodiment.

FIG. 3 illustrates the logic diagram for the engine core of the picoprocessor in one embodiment. The first three instruction register bits ir(m) (m=0,1,2) enter the system at the top left, and each of the values ir(2), ir(2)*, ir(1), ir(1)*, ir(0) and ir(0)* is coupled to at least four of the eight horizontal lines that feed four identical combinations C0, C1, C2 and C3 of two one-input AND gates. Each pair of these AND gates C0, C1, C2 and C3 feeds a different two-input OR gate as shown in FIG. 3. The output signals ir(2)* and ir(1)* are connected to the two input lines that feed the first combination C0. One of these two inputs is also connected to the first bit line ir(0)*, and the other of these two input lines is also connected to the first bit line ir(0) so that the value of the first bit (ir(0)* or ir(0)) becomes a "don't care" signal for the value of ir(0). The output signal of the OR gate in the combination C0 thus becomes $O_0=ir(2)^*.ir(1)^*$; the value of the output signal $O_0$ is equal to 1 if and only if ir(1)=ir(2)=0. This corresponds to opcodes 0 and 1. In a similar manner, the output signals of the combinations C1, C2, and C3 correspond to the output signals $O_1=ir(1).ir(2)^*$, $O_2=ir(1)^*.ir(2)$, and $O_3=ir(1).ir(2)$, respectively, which correspond to the respective opcode pairs (2,3), (4,5) and (6,7).

A separate AND gate AG in FIG. 3 receives the first bit signal ir(0) and produces a polarity control output signal $O_4=ir(0)$. If $O_4=0$, the t bit in the T register is not logically complemented and one of the opcode instructions 0, 2, 4, or 6 is implemented; if the output signal $O_4=1$, the t bit in the T register is first logically complemented (t→t*) so that one of the four opcode instructions 1, 3, 5 or 7 is implemented.

An input signal from the input port 21 (not shown in FIG. 3) arrives on a sense line SL at a first gate combination TC1 of two two-input AND gates whose outputs feed a two-input OR gate as shown in FIG. 3. The first AND gate receives the input port signal (t bit) at a first input terminal and receives the complement ($O_2^*$) of the opcode instruction signal $O_2$ at its second input terminal; the opcode instruction signal $O_2$ and another signal described below ($O_{10}$) are received at the first and second input terminals of the second AND gate in the gate combination TC1. The gate combination TC1 produces an output signal $O_5=b_{in}.O_2^*+O_{10}.O_{12}$, where $b_{in}$ is the bit admitted on the sense line SL; and the signal $O_5$ is fed to the D input terminal of a D type flipflop or latch FF1 that serves as part of the T register 27; fliplop FF1 also receives a clock signal CLK at a clock input terminal G from a clock source 41. An output signal $O_6$ is produced at the Q output terminal of the flipflop FF1, and a second (complementary) output signal $O_6^*$ is produced at the Q* terminal of flipflop FF1. A second gate combination TC2 of two 2-input AND gates that feed a 2-input OR gate is provided, and the output signals $O_6$ and $O_6^*$ are fed to an input terminal of the first AND gate and to an input terminal of the second AND gate, respectively, as shown. The second input terminal of the first AND gate of the gate combination TC2 also receives the complement of the polarity control signal $O_4$, and the second input terminal of the second AND gate receives the polarity control signal $O_4$. The OR gate of the gate combination TC2 produces an output signal $O_7=O_4 \oplus O_6$; that is, $O_7$ is the EXCLUSIVE OR combination of $O_4$ and $O_6$ and is equal to 1 if and only if the signals $O_4$ and $O_6$ differ from one another.

A third gate combination AC1 of two two-input AND gates that feed a two-input OR gate is also a part of the structure of FIG. 3. The two input terminals of the first AND gate of gate combination AC1 receive the complement of the output signal $O_3$ and receive a second signal $O_8$ (described below) from the logic function unit 25. The two input terminals of the second AND gate of gate combination AC1 receive the output signals $O_3$ and $O_7$. The output signal $O_9=O_8.O_3^*+O_7.O_3$ from the gate combination AC1 is equal to 1 if opcode instructions 6 or 7 are not selected and the output signal $O_7$ associated with the T register is equal to 1, or if opcode instruction 6 or 7 is selected and the output signal $O_8$ from the logic function unit is equal to 1.

The output signal $O_9$ is fed to the D input terminal of a second flipflop FF2 that is part of the A register 29 that also receives the complement (CLK*) of the clock signal from the clock pulse source 41 at its clock input terminal G. The flipflops FF1 and FF2 are standard D-type flip flops that merely latch their respective input signals for one time interval and then issue the latched signals ($O_6$ and $O_{10}$, respectively) as output signals. The output signal $O_{10}$ that is issued by the flipflop FF2 is received by another D type flipflop FF3 (optional) that issues an output signal $O_{11}$; the signal $O_{11}$ is received by the logic function unit 25. If the flipflop FF3 is not included, the output signal $O_{10}$ of the flipflop FF2 is received directly by the logic function unit 25; that is, $O_{11}=O_{10}$.

Note that the flipflops FF1 and FF2 receive complementary clock signals from the clock pulse source 41 in FIG. 3. This insures that the A register 29 is open during a time interval when the T register 27 is closed and that the T register 27 is open during a time interval when the A register 29 is closed, as indicated graphically in FIG. 4. The H flipflop FF3 (optional) receives the clock signal CLK that has the same polarity as the clock signal received by the T flipflop FF1.

Returning to FIG. 3, the output signals $O_0$, $O_1$ and $O_2$ are received at an input terminal of a two-input AND gate AG1 a three-input AND gate AG2 and a two-input AND gate AG3, respectively. The AND gate AG2 and a two-input OR gate ORG1 each receive the output signal $O_7$ as input signals thereto, An input terminal of each of the OR gate ORG1, the AND gate AG2 and the AND gate AG3 receives the input signal $O_{11}$ from the flipflop FF3 associated with the H register. The OR gate ORG1 issues an output signal $O_{12}=O_7.O_{11}$ that is received by a second input terminal of the AND gate AG1. The output signals of each of the AND gates AG1, AG2 and AG3 are received at three input terminals of a second OR gate ORG2. In FIG. 3, the logic gates ORG1, AG1, AG2, AG3 and ORG2, connected as described, comprise one embodiment of the logic function unit 25. The second OR gate ORG2 issues an output signal $O_8$ that is fed to one of the input terminals for one of the AND gates that comprise the gate combination AC1.

The output signal $O_7$ is the t bit and the output signal $O_{11}$ (or $O_{10}$) is the a bit. The output signal $O_8$ of the logic function unit 25 thus becomes $$O_8 = (a+t) \cdot O_0 + (a \cdot t) \cdot O_1 + a \cdot O_2,$$

which reproduces the result of one of the opcode instructions number 0, 2 or 4 in Table 1. The output signal $O_{10}$ of the gate combination AC1 and flipflop FF2 is thus $O_8$, if opcodes 6 or 7 are not selected, or the t bit (output signal $O_7$) if opcode 6 or 7 is selected from Table 1. The output signal $O_{10}$ is fed back to one input terminal of the second AND gate in the gate combination TC1 so that, if opcode 4 or 5 is selected from Table 1, (putbit(f)=a or a*, which requires $O_2 = 1$), the output signal of the gate combinations TC1 and TC2 become $O_5 = a$ and $O_7 = a \oplus O_4$. This output signal $O_7$ is also sent to a two-input AND gate AG4 that also receives the signal $O_2$ and produces an output signal $O_{13} = O_2 \cdot O_7$ that is active only if $O_2 = 1$. This output signal $O_{13}$ is fed to the control line CL; this provides the desired output signal for the command putbit(f)=a or a* of opcodes 4 and 5. The dyadic logic unit required to perform the conditional branch required for opcodes 6 and 7 is not shown in FIG. 3.

Figure 4:
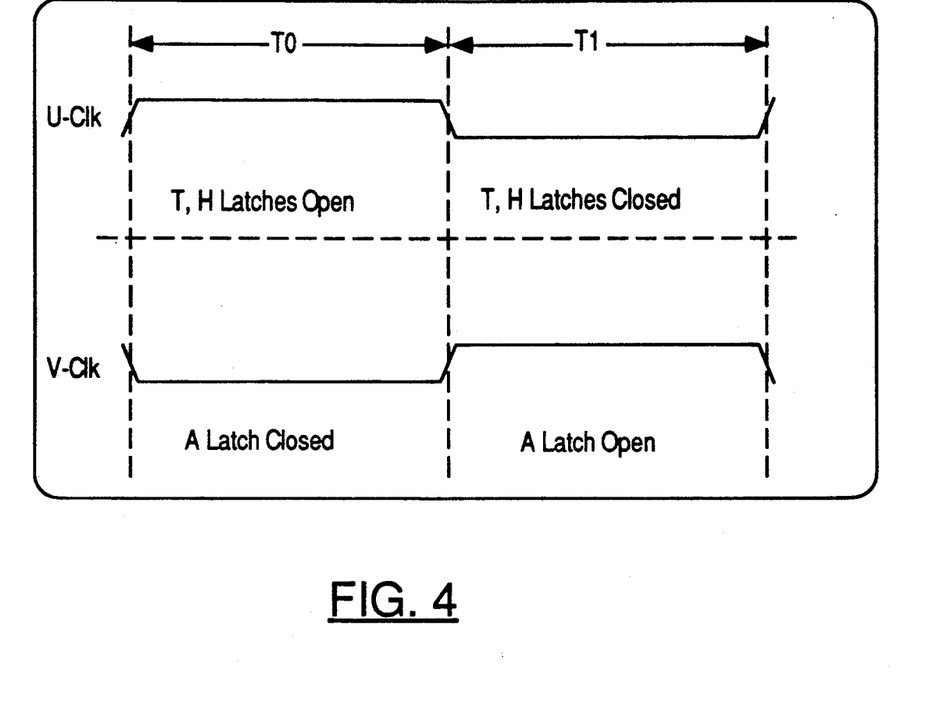
FIG. 4 graphically illustrates the relationship of the A register and the T register (or, alternatively, the A, T and H registers) clock timing signals used in a systolic timing sequence.

The optional H register, represented by the flipflop FF3 in FIG. 3, receives and temporarily holds the output signal $O_{10}$ from the A register for one clock time interval and then issues this temporarily stored signal as an output signal $O_{11}$ as an input signal to the logic function unit 25. This allows the picoprocessor to provide for simple recursion relations between the logical variables; and it minimizes the "race problem" that might occur if the current a bit, rather than the preceding a bit that is held in the H register, is used in the logic function unit 25. For example, the immediately preceding value of the a bit held in the A register might be used for conditional branching, using the opcode instructions 6 and 7 from Table 1. However, a configuration that includes and uses an H register in addition to the T register and A register, will have additional associated time delay. If the H register is included in the configuration, the clock pulse that drives the T register also drives the H register, as indicated in FIG. 4.

The t bit used in the picoprocessor 20 is a temporary bit and is replaced at every instruction interval. The a bit used in the picoprocessor 20 is effectively a "context" bit that indicates the present state of the current process. The a bit can be stacked in an LIFO register (optional) as indicated in FIG. 1; use of a LIFO stack allows re-entry of a process and nesting of processes. A "process" here is anything that is to be controlled by the the picoprocessor. Use of the H register 32 and the associated output signal $O_{11}$ allows the a bit to be temporarily stored and reused, for example in certain recursion relations that require use of the preceding a bit value.

Figure 7B:
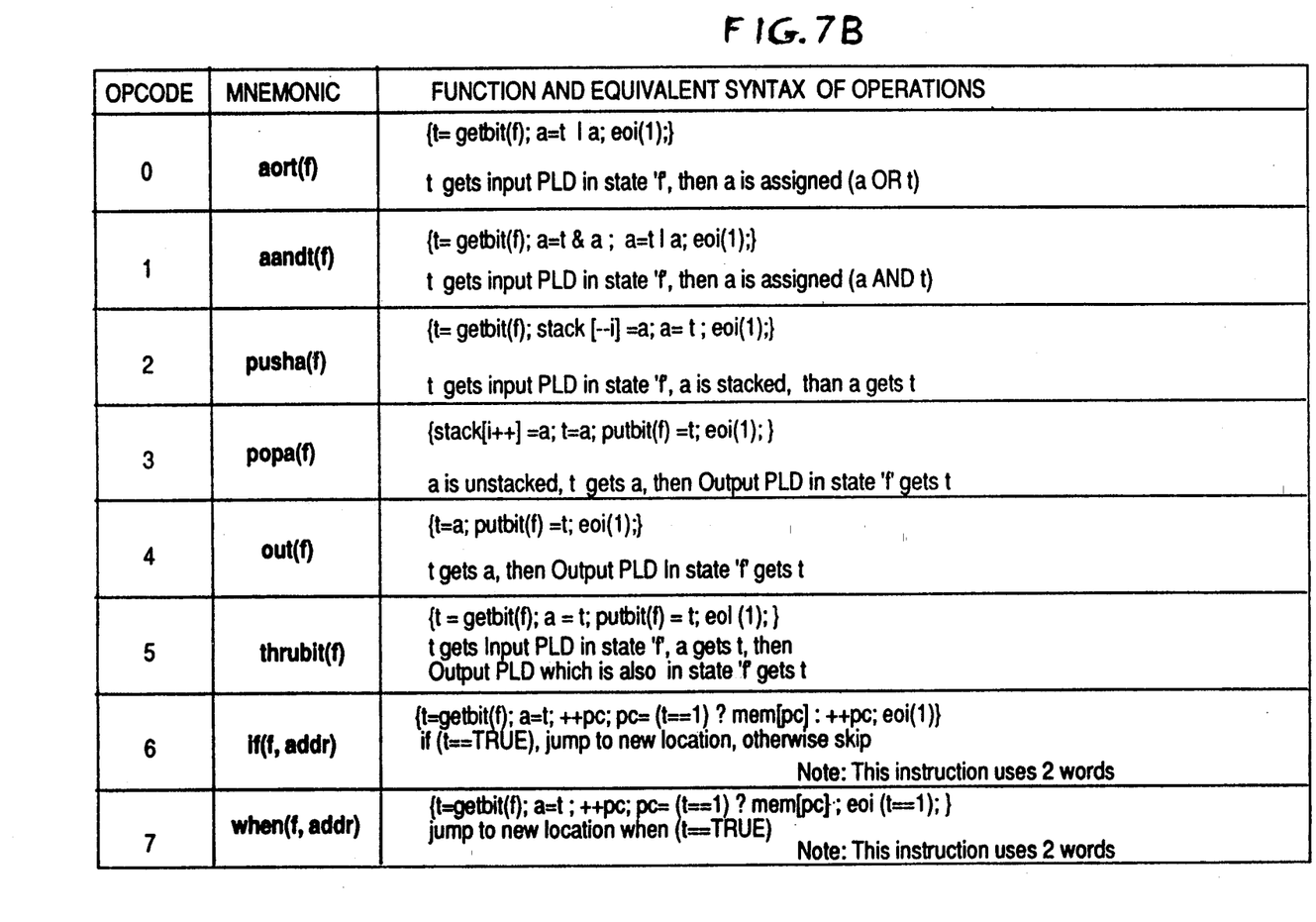

Table 2 presents a high level, alternative opcode instruction set for the picoprocessor, one of many that can be provided. In FIG. 7B, the opcode instructions 0, 1, 4 and 6 correspond to the opcode instructions 0, 2, 4 and 6 respectively, shown in Table 1. Formation of the logical complement of a logical variable or logical statement (part of opcode instruction 1, 3, 5 or 7 in Table 1) is implemented in the input port 21 in FIG. 1, which now operates as a simple programmable logic device that includes formation of a logical complement of an input variable. As another option, formation of the logical complement of a logical variable (bit) may be implemented by the output port 23 in FIG. 1, which now operates as a simple programmable logic device.

Figure 5:
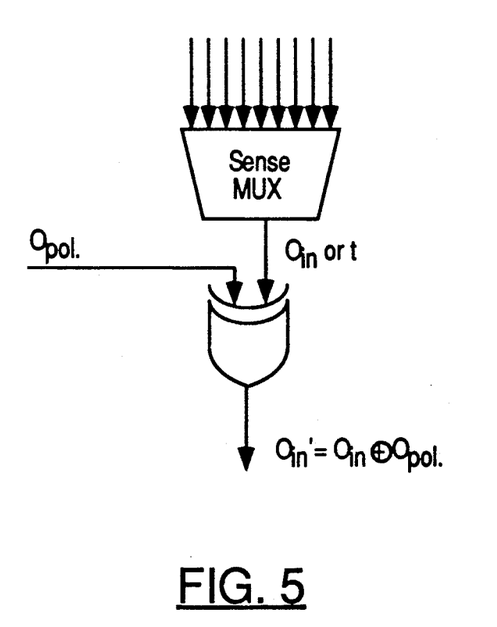
FIG. 5 schematically illustrates the use of an EXCLUSIVE OR gate at an input port of the processor in FIG. 1 to produce a programmable logically complemented signal at the input port.

FIG. 5 illustrates how an EXCLUSIVE OR gate XORG, which receives the input line signal $O_{in}$ within the input port 21 in FIG. 1 and receives a polarity control signal $O_{pol.}$ as input signals thereto, can produce a modified output signal $O_{in}'$ for the input port, viz.

$$\begin{aligned} O'_{in} &= O_{in} \oplus O_{pol.} \\ &= O_{in} \text{ if } O_{pol.} = 0 \\ &= O_{in} * \text{ if } O_{pol.} = 1. \end{aligned}$$

In an analogous manner, in a modified output signal $O_{out}' = O_{out}' \oplus O_{pol.}$ can be produced at the output port 23 in FIG. 1.

Table 2 allows the use of four additional opcode instructions. Opcode instructions 2 and 3 refer to "pushing" and "popping" the a bit onto or off of the LIFO register 30 shown in FIG. 1 (from the top-most or the bottom-most bit position in the LIFO register) in a well-known manner. With opcode instruction 2 in Table 2 commanded, the current a bit is stored in the LIFO register 30, and the value of the a bit is replaced by the value of the new t bit received on the sense line designated by the flag select bits f. With opcode instruction 3 in Table 2 commanded, the A register receives the top-most bit of the LIFO register (or the bottom-most bit, if one prefers); then the t bit is replaced by the current a bit, and the new t bit is sent to output on one of the control lines designated by the flag select bits f.

If opcode instruction 5 in FIG. 7B is commanded, the sense line designated by the flag select bit is read and the data bit on that line is placed in the T register and in the A register; then the t bit is sent to output on the control line designated by the same flag select bits f. The thrubit command of opcode instruction 5 passes a bit on a designated sense line to the A register and passes that bit immediately through the picoprocessor system to the output (control) line with the same flag select bits as the incoming (sense) line that provided that bit initially.

Opcode instruction 7 in FIG. 7B is another conditional branch or jump operation; but this branch occurs at any point in the process when a prescribed logical condition is satisfied. Under opcode instruction 7, a bit on one of the designated input (sense) lines is placed in the T register and in the A register; this instruction commands a jump to a new instruction whose number is given at the memory address addr when the logical value of the t bit is 1. Opcode instructions 6 and 7 in Table 2 each require two words so that the instruction counter 35 is incremented by two when either of these commands is implemented.

Figure 6:
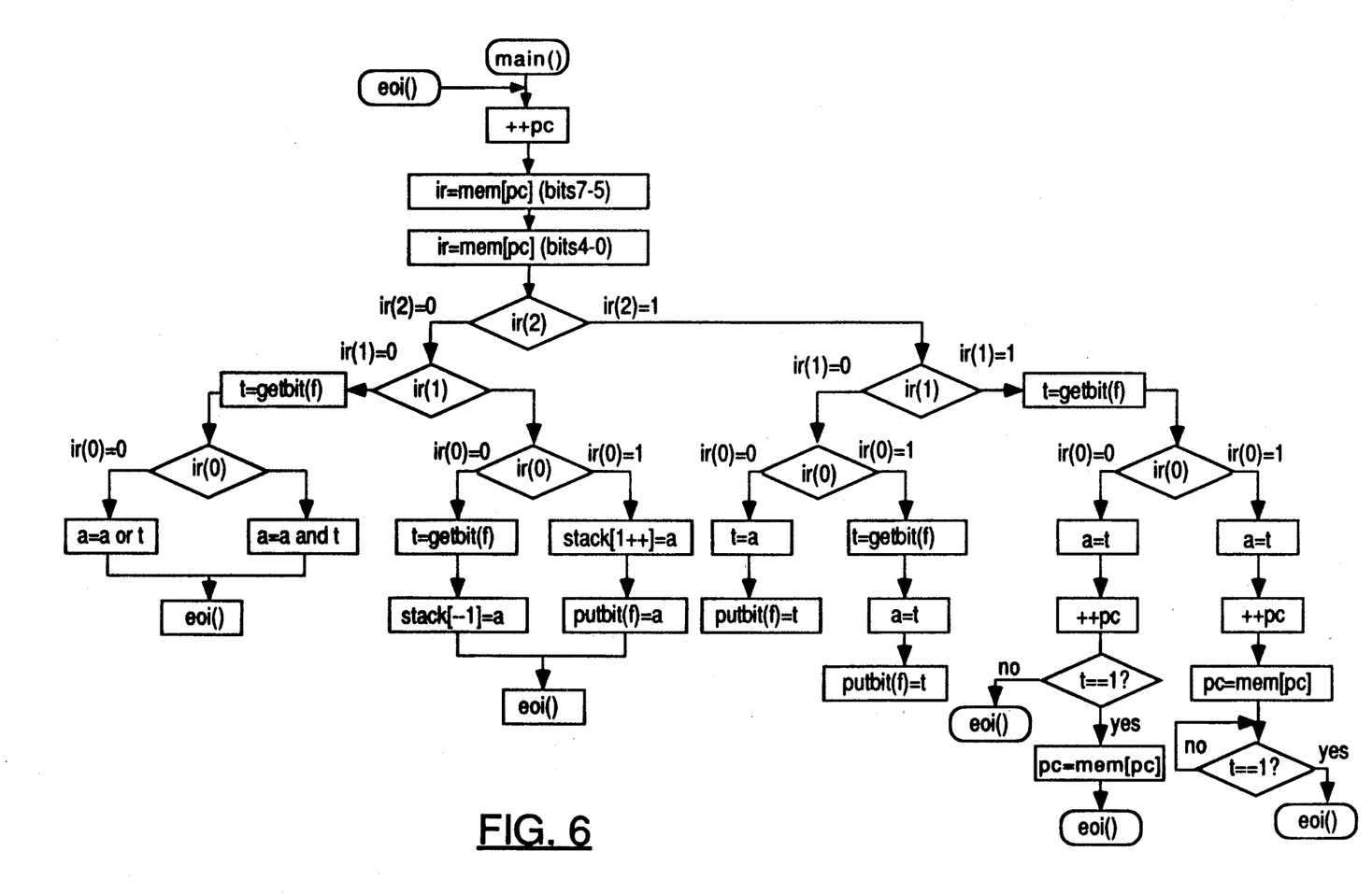
FIG. 6 schematically illustrates the picoprocessor instruction switch tree for the alternative instruction set presented in Table 2.

FIG. 6 displays the opcode instruction switch tree for the alternative opcode instruction set that is shown in Table 2. The analysis of FIG. 6 is analogous to the analysis of FIG. 2. The algorithm for choice of opcode here is opcode (number) = $4 \cdot ir(2) + 2 \cdot ir(1) + 1 \cdot ir(0)$.

The two instruction sets shown in Tables 1 and 2 do not, of course, exhaust the possibilities of instruction sets. An instruction set with as few as four instructions (e.g., opcode instructions no. 0, 2, 4 and 6 in Table 1) may be used, if the operation of taking the complement of the t variable is incorporated in the input port 21 and/or the output port 23 in FIG. 3, which then becomes a programmable logic device. An instruction set with more than eight instructions may be used to provide a high level instruction set that is more flexible than the sets shown in Tables 1 and 2. For any instruction set, the basic configuration shown in FIG. 1 is unchanged, but the logic function unit and possibly the input port and/or output port 23 may be changed.

A few examples of the use of particular sequences of opcode instructions will indicate how the picoprocessor may be programmed to perform certain bit stream processing tasks. First, set the bits on the input (sense) lines and output (control) lines as shown below.

| Line | Line Name | Explanation |
| --- | --- | --- |
| 0(in) | zerolit | a hard zero available on input sense line 0 |
| 1(in) | onelit | a hard one, available on input sense line 1 |
| 2(in) | cond1 | sense line 2 carries bit representing first condition (high=true) |
| 3(in) | cond2 | sense line 3 carries bit representing second condition (high=true) |
| 4(in) | cond3 | sense line 4 carries bit representing third condition (high=true) |
| 5(in) | cond4 | sense line 5 carries bit representing fourth condition (low=true) |
| 0(out) | alltrue | output control line 0 is high if all conditions 1–4 are true |

A macro instruction is needed to clear the a bit initially. This is accomplished by the definition clra = aandt (zerolit).

This macro instruction reads a literal 0 into the T register then ands it with whatever was previously in the A register and places the new result (definitely a 0) into the A register. If, instead, a definite 1 is needed in the a register initially, one suitable macro instruction would be seta = aort (onelit).

As a first example, the operator can set a control bit conditionally upon interrogation of several input signals (conditions 1–4); all conditions must be true if the control bit (output) is to be set. This is accomplished by the following sequence of opcode instructions:

```
clra;
aort(cond1);
aandt(cond2);
aand(cond3);
aandtc(cond4);
out(alltrue).
```

In the preceding sequence, the control output line 0 will be contain a 1 if and only if each of conditions 1–4 was true.

As a second example, a control bit is to be set if any one or more of several input signals is true (including the fourth condition, which is low if true). One additional definition is needed. Output control bit 1 is given the name onetrue and is 1 if and only if at least one of the conditions 1–4 is true. For this example, a suitable sequence of opcode instructions would read as follows:

```
clra;
ift(cond1, setit);
ift(cond2, setit);
ift(cond3, setit);
iftc(cond4, setit);
ift(onelit, exit);
setit;
out(onetrue);
exit.
```

If none of the four conditions 1–4 was true, this sequence is ended and the processor causes a jump out of this sequence to some other sequence through the command exit.

As a third example, assume a pulse is to be generated upon receipt of, or the presence of, a particular bit (0 or 1) in the A register. One additional macro instruction may be useful here. Define endloop to be the macro instruction ift(onelit, exit). A second useful macro instruction is output, which requires that control line 0 be used for the output bit. In order to generate an active-low pulse on an output line, the following sequence of opcode instructions may be used:

```
seta;
outc(output);
out(output);
endloop.
```

In order to generate an active-high pulse on an output line, the following sequence of opcode instructions may be used:

```
clra;
outc(output);
out(output);
endloop.
```

Other sequences of instructions are easily set down that will perform a first sequence if a condition 1 is true, and then exit; and perform a second sequence if a condition 2 is true, and then exit; and if neither condition is true the processor will loop back check the values again. Loop back may be used to obtain state or memory values that can be manipulated through the picocode. The bits may be dealt with sequentially or hierarchically or in some other manner.

Although the preferred embodiments of the invention have been shown and described herein, variation and modification may be made without departing from the scope of the invention.

I claim:

1. A processor of a plurality of digital bit streams, the processor comprising:

an instruction module that holds a sequence of M-bit control words, numbered in increasing order or in decreasing order, where each control word comprises $m_2$ input/output line select bits and $m_1$ opcode select bits, where $m_1$ and $m_2$ are positive integers and $m_1 + m_2 = M$, where the instruction module reads the sequence or control words in increasing order or in decreasing order and issues a first output signal that comprises the input/output line select bits of a control word and issues a second output signal that comprises the opcode select bits of that control word;

an input port that has up to $2^{m_2}$ input terminals, with each such input terminal receiving a digital input bit stream, said input port also having a control terminal and an output terminal, where the control terminal receives as a control signal the first output signal from the instruction module and this control signal selects which input bit stream presently appears as an output signal at the output terminal;

a first register having an input terminal to receive and temporarily store the bit issued as an output signal by the input port and having an output terminal to issue a bit $b_1$ stored in the first register as an output signal;

a second register having first and second input terminals, said first input terminal for receiving and temporarily storing a bit representing a process variable, said second register also having an output terminal for issuing a bit $b_2$ stored in the second register as a process output signal;

a logic function module having two input terminals to receive as first and second input signals the output signals issued by the first and second registers, having a control terminal to receive as a control signal the second output signal from the instruction module, and having an output terminal, where receipt of a control signal causes the logic function module to form and issue as an output signal any one of a group of up to $2^{m_1}$ distinct, predetermined logical functions and commands $f(b_1,b_2)$ of the first and second input signals, where the output signal of the logic function module is received as an input signal at said second input terminal of the second register;

an output port having an input terminal, a control terminal and up to $2^{m_2}$ output terminals, where the input terminal receives as an input signal the output signal from the second register and where the control terminal receives the first output signal from the instruction module as a control signal and this control signal selects at which output terminal the input signal is issued as an output signal;

a source of clock signals connected to the instruction module, to the input port and output port, and to the first and second registers, to provide a sequence of clock signals that indicates when each control word is to be replaced by a succeeding control word; and wherein said group of logical functions and commands associated with said logic function module includes each of the following logical functions and commands:

$f(b_1,b_2) = b_1 + b_2$;
$f(b_1,b_2) = b_1^* + b_2$;
$f(b_1,b_2) = b_1 \cdot b_2$;
$f(b_1,b_2) = (b_1^*) \cdot b_2$;
$f(b_1,b_2) = b_2$, then issue $b_2$ as output signal from said output port; and
$f(b_1,b_2) = b_2^*$, then issue $b_2^*$ as an output signal from said output port;
where $b_1^*$ is the logical compliment of bit $b_1$ and bit $b_2^*$ is the logical compliment of bit $b_2$.

2. A processor of a plurality of digital bit streams, the processor comprising:

an instruction module that holds a sequence of M-bit control words, numbered in increasing order or in decreasing order, where each control word comprises $m_2$ input/output line select bits and $m_1$ opcode select bits, where $m_1$ and $m_2$ are positive integers and $m_1 + m_2 = M$, where the instruction module reads the sequence or control words in increasing order or in decreasing order and issues a first output signal that comprises the input/output line select bits of a control word and issues a second output signal that comprises the opcode select bits of that control word;

an input port that has up to $2^{m_2}$ input terminals, with each such input terminal receiving a digital input bit stream, said input port also having a control terminal and an output terminal, where the control terminal receives as a control signal the first output signal from the instruction module and this control signal selects which input bit stream presently appears as an output signal at the output terminal;

a first register having an input terminal to receive and temporarily store the bit issued as an output signal by the input port and having an output terminal to issue a bit $b_1$ stored in the first register as an output signal;

a second register having first and second input terminals, said first input terminal for receiving and temporarily storing a bit representing a process variable, said second register also having an output terminal for issuing a bit $b_2$ stored in the second register as a process output signal;

a logic function module having two input terminals to receive as first and second input signals the output signals issued by the first and second registers, having a control terminal to receive as a control signal the second output signal from the instruction module, and having an output terminal, where receipt of a control signal causes the logic function module to form and issue as an output signal any one of a group of up to $2^{m_1}$ distinct, predetermined logical functions and commands $[f(b_1,b_2)]$ of the first and second input signals, where the output signal of the logic function module is received as an input signal at said second input terminal of the second register;

an output port having an input terminal, a control terminal and up to $2^{m_2}$ output terminals, where the input terminal receives as an input signal the output signal from the second register and where the control terminal receives the first output signal from the instruction module as a control signal and this control signal selects at which output terminal the input signal is issued as an output signal;

a source of clock signals connected to the instruction module, to the input port and output port, and to the first and second registers, to provide a sequence of clock signals that indicates when each control word is to be replaced by a succeeding control word; and wherein said input port includes complementation means for forming the logical complement of a bit appearing in said input bit stream, and said input port control signal determines whether this bit or its logical complement appears as said output signal of said input port.

3. A processor of a plurality of digital bit streams, the processor comprising:

an instruction module that holds a sequence of M-bit control words, numbered in increasing order or in decreasing order, where each control word comprises $m_2$ input/output line select bits and $m_1$ opcode select bits, where $m_1$ and $m_2$ are positive integers and $m_1 + m_2 = M$, where the instruction module reads the sequence or control words in increasing order or in decreasing order and issues a first output signal that comprises the input/output line select bits of a control word and issues a second output signal that comprises the opcode select bits of that control word;

an input port that has up to $2^{m_2}$ input terminals, with each such input terminal receiving a digital input bit stream, said input port also having a control terminal and an output terminal, where the control terminal receives as a control signal the first output signal from the instruction module and this control signal selects which input bit stream presently appears as an output signal at the output terminal;

a first register having an input terminal to receive and temporarily store the bit issued as an output signal by the input port and having an output terminal to issue a bit $b_1$ stored in the first register as an output signal;

a second register having first and second input terminals, said first input terminal for receiving and temporarily storing a bit representing a process variable, said second register also having an output terminal for issuing a bit $b_2$ stored in the second register as a process output signal;

a logic function module having two input terminals to receive as first and second input signals the output signals issued by the first and second registers, having a control terminal to receive as a control signal the second output signal from the instruction module, and having an output terminal, where receipt of a control signal causes the logic function module to form and issue as an output signal any one of a group of up to $2^{m_1}$ distinct, predetermined logical functions and commands [$f(b_1,b_2)$] of the first and second input signals, where the output signal of the logic function module is received as an input signal at said second input terminal of the second register;

an output port having an input terminal, a control terminal and up to $2^{m_2}$ output terminals, where the input terminal receives as an input signal the output signal from the second register and where the control terminal receives the first output signal from the instruction module as a control signal and this control signal selects at which output terminal the input signal is issued as an output signal;

a source of clock signals connected to the instruction module, to the input port and output port, and to the first and second registers, to provide a sequence of clock signals that indicates when each control word is to be replaced by a succeeding control word; and wherein said output port includes complementation means for forming the logical complement of a bit appearing at said output terminal of said output port that is selected by said output port control signal, and said output port control signal determines whether this bit or its logical complement appears as said output signal at said output port.

* * * * *